United States Patent [19]
Thomson

[11] Patent Number: 5,197,612
[45] Date of Patent: Mar. 30, 1993

[54] FREESTANDING BOTTLE STAND

[76] Inventor: Jonathan L. Thomson, P.O. Box 82808, Kenmore, Wash. 98028

[21] Appl. No.: 891,371

[22] Filed: May 29, 1992

[51] Int. Cl.$^5$ ............................................. A47F 7/00
[52] U.S. Cl. ................................. 211/74; D7/616; 248/312
[58] Field of Search .............. 211/74; D7/616, 617, D7/618; 248/312, 164, 165, 431

[56] References Cited

U.S. PATENT DOCUMENTS

| D. 253,802 | 1/1980 | Loud et al. | |
|---|---|---|---|
| 3,901,389 | 8/1975 | Belokin, Jr. | 211/74 |
| 4,496,124 | 1/1985 | Cole | 248/146 |

FOREIGN PATENT DOCUMENTS

| 2545971 | 4/1977 | Fed. Rep. of Germany . | |
|---|---|---|---|
| 2470158 | 5/1981 | France . | |
| 418111 | 2/1967 | Switzerland . | |
| 2045079 | 10/1980 | United Kingdom | 211/74 |
| 2229352 | 9/1990 | United Kingdom | 211/74 |

Primary Examiner—Robert W. Gibson, Jr.
Attorney, Agent, or Firm—Robert W. Beach

[57] ABSTRACT

The edges of crossing legs of rectangular cross section have interfitting notches for holding the legs in approximately perpendicular relationship to form an X-shaped bipod bottle stand, and such legs have through them apertures for receiving the necks of bottles to support the bottles in cantilever fashion.

16 Claims, 5 Drawing Sheets

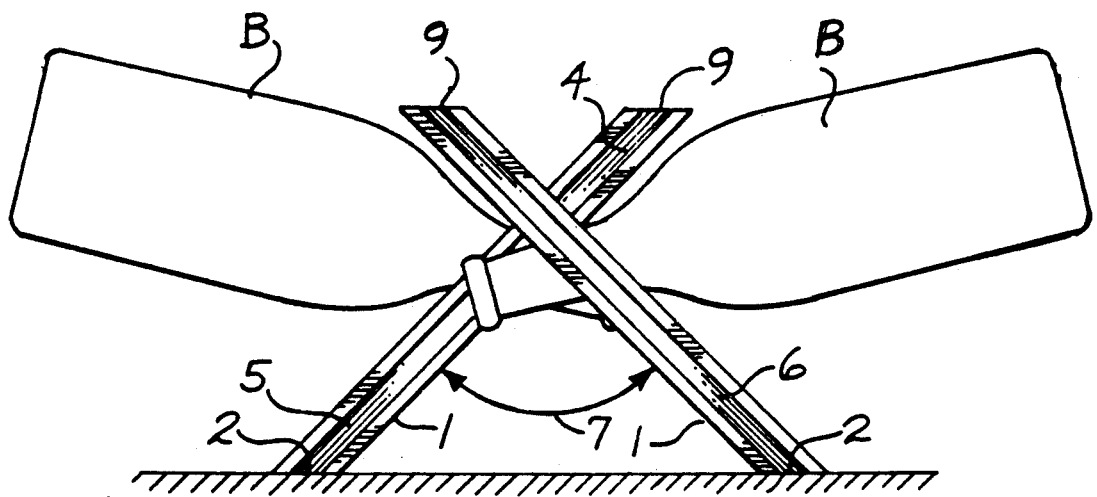
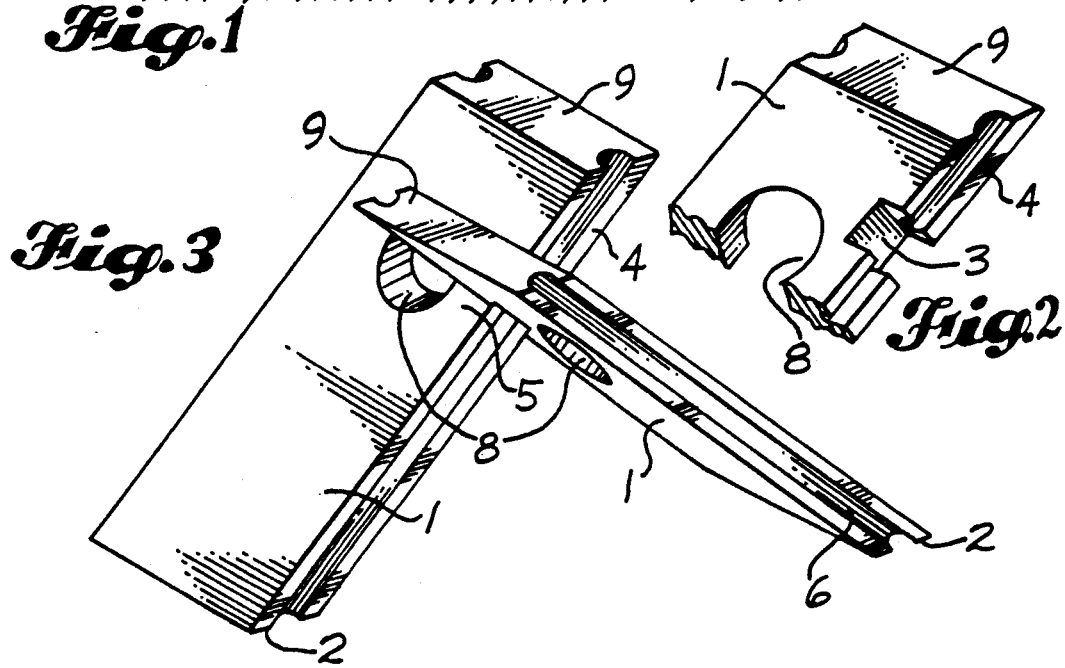
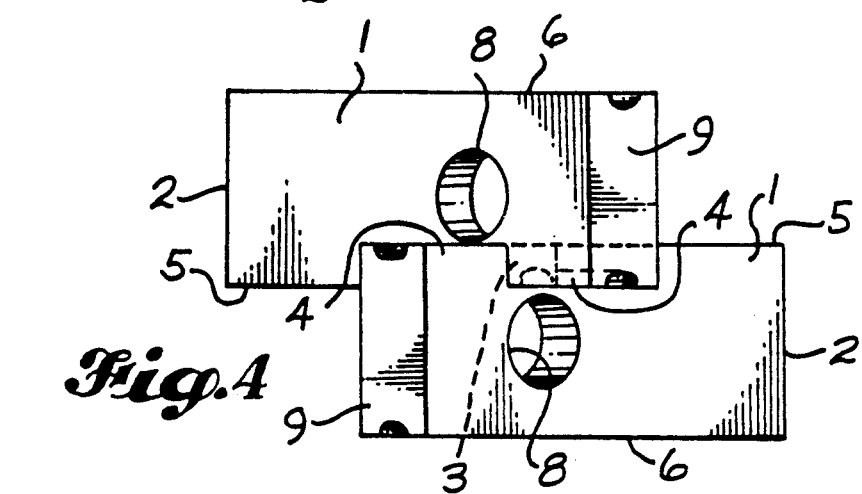

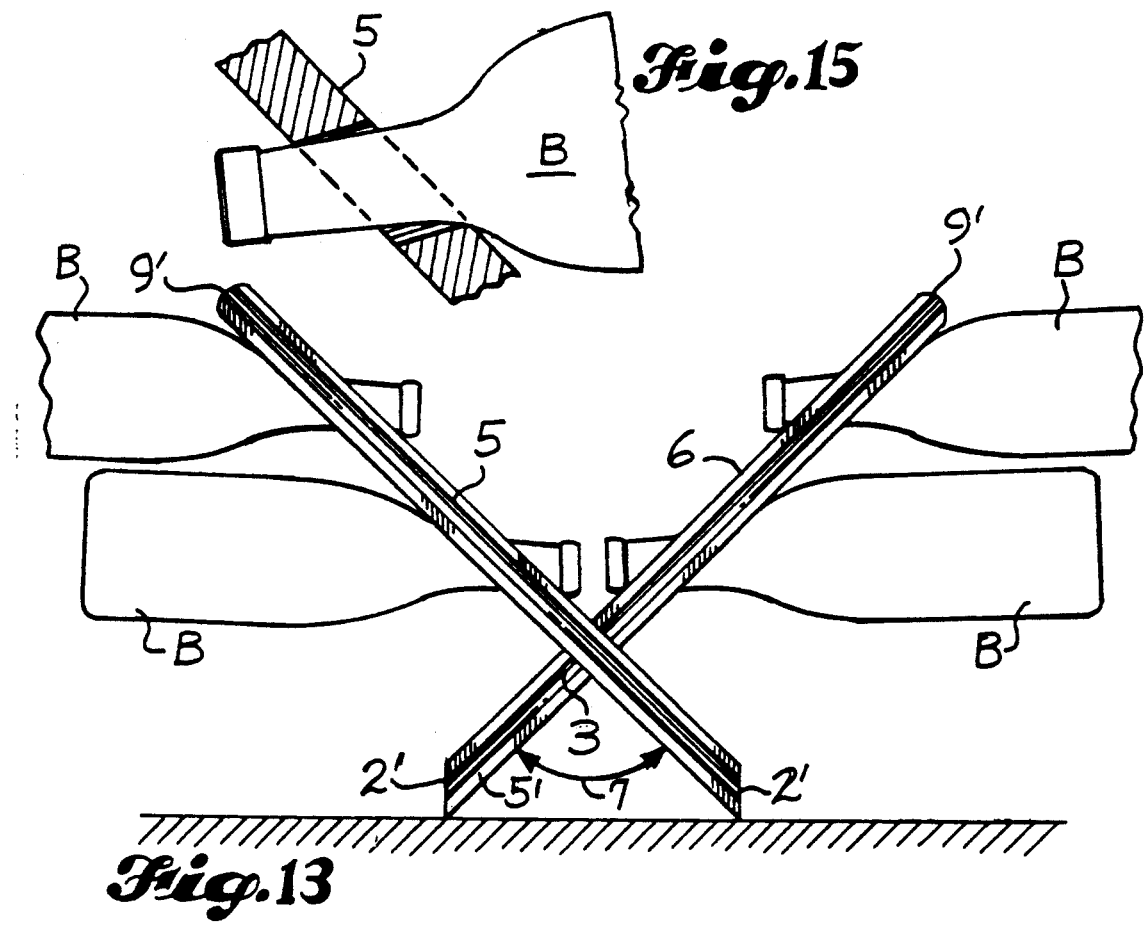
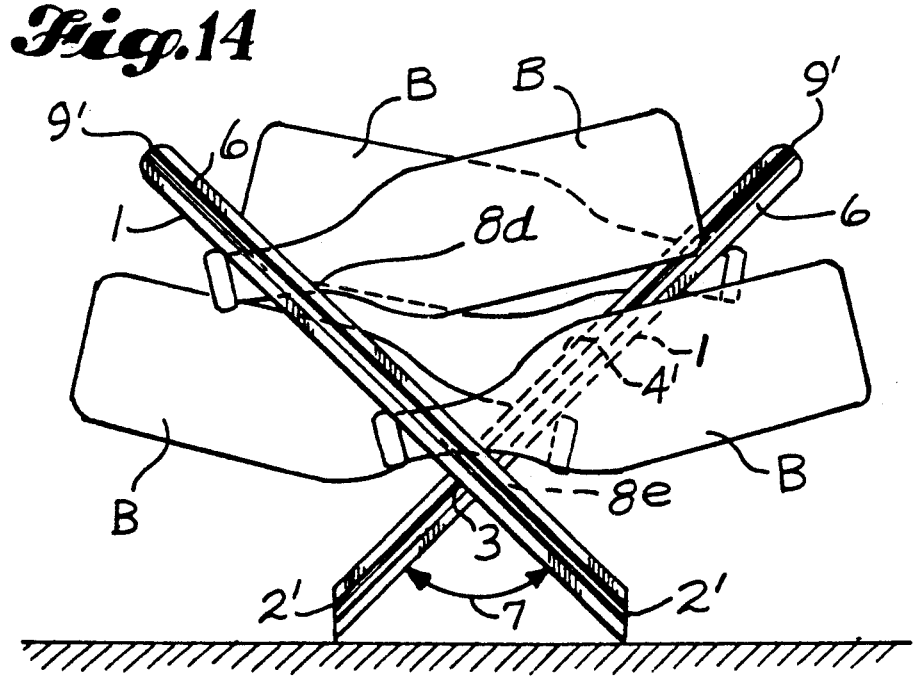

FREESTANDING BOTTLE STAND

BACKGROUND OF THE INVENTION

1. Field of the Invention

This invention relates to freestanding stands for holding bottles, particularly wine bottles.

2. Prior Art

Various proposals have been made for freestanding bottle stands which have apertures in them to hold the necks of bottles so that each bottle is supported in cantilever fashion.

Swiss patent No. 418,111, published Feb. 15, 1967, which was cited as a reference against the application resulting in Cole U.S. Pat. No. 4,496,124, issued Jan. 29, 1985, shows a single upright board or panel having two rows of apertures through it for receiving the necks of bottles. German patent No. 25 45 971, published Apr. 28, 1977, also cited against the application resulting in U.S. Pat. No. 4,496,124, shows a similar bottle stand in FIGS. 1 and 2, except that five rows of apertures for receiving bottlenecks is shown instead of two rows.

Loud et al. U.S. Pat. No. 253,802, issued Jan. 1, 1980, also cited against the application resulting in U.S. Pat. No. 4,496,124, shows two upright boards mounted in parallel spaced relationship, each board having a vertical row of apertures through it, presumably for receiving the necks of wine bottles.

French patent No. 2,470,158, issued May 29, 1981, also cited against the application resulting in U.S. Pat. No. 4,496,124, shows in FIGS. 1 and 2 an easel type of bottle rack, one leg of the easel having six vertical rows of apertures shown in FIG. 3 as being intended to receive the necks of wine bottles.

Belokin, Jr. U.S. Pat. No. 3,901,389, issued Aug. 26, 1975, also cited against the application resulting in U.S. Pat. No. 4,496,124, shows a variety of stands for supporting bottles, the upright member in each instance having apertures through which the necks of the bottles can be projected as shown in FIG. 3, for example, for supporting bottles in cantilever fashion. FIGS. 8 and 12 show inclined upright members as distinguished from vertical members having apertures for receiving necks of bottles as illustrated in FIG. 10.

Cole U.S. Pat. No. 4,496,124, issued Jan. 29, 1985, referred to above, shows a bottle support in the form of a single upright board having a single aperture through it for receiving the neck of a bottle, the end surfaces of which board are beveled at an angle of 60 degrees to horizontal and 30 degrees to vertical as shown in FIG. 3.

SUMMARY OF THE INVENTION

A principal object of the present invention is to provide a bottle rack, the principle of which can readily be adapted to different capacities and which can be self-standing whether empty, full of bottles or partially full, and is essentially stable, although it can topple over if the bottle load on the stand is unbalanced.

Another object is to provide a bottle stand that is compact and of simple and economical construction while having an attractive appearance.

A further object is to provide a bottle stand which is of knockdown construction, enabling the components of the stand to be stored compactly while the construction is such that the stand can be set up in operative condition quickly and easily.

The foregoing objects can be accomplished by a self-standing bipod bottle stand composed of two legs that can be connected by interengageable edge notches to dispose the legs in slightly overlapping crossed relationship.

BRIEF DESCRIPTION OF THE DRAWINGS

FIG. 1 is a side elevation of a simple form of the bottle stand.

FIG. 2 is a fragmentary detail top perspective of one component of the stand.

FIG. 3 is a top perspective of the stand.

FIG. 4 is a top plan of the stand.

FIG. 13 is a side elevation of a bottle stand that can be set up using the components of the bottle stand shown in FIGS. 5 to 7.

FIG. 14 is a side elevation of a stand generally of the type shown in FIG. 13 but with different aperture configurations.

FIG. 15 is a detail section through a bottleneck-receiving aperture of the stand shown in FIG. 14.

DETAILED DESCRIPTION

Figure 5:
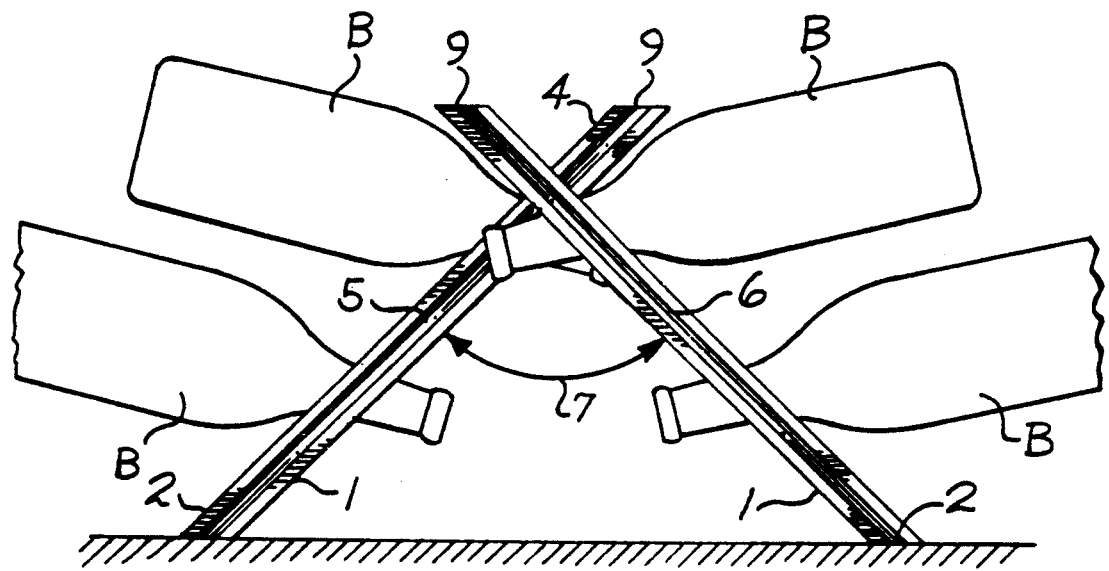
FIG. 5 is a side elevation of a similar bottle stand having a larger capacity than the stand shown in FIGS. 1 to 4, inclusive.

All of the bottle stands of the present invention are of the type which support bottles, such as wine bottles, by their necks, which type of bottle support is utilized by the stands of the various prior art references referred to above. The engagement of a bottleneck in an aperture of a supporting stand is shown particularly in FIG. 1 of German patent No. 25 45 971, FIG. 3 of French patent No. 2,470,158, FIGS. 3 and 10 of U.S. Pat. No. 3,901,389, and FIG. 3 of U.S. Pat. No. 4,496,124, particularly where the apertured member is inclined as shown in the French patent, FIG. 10 of U.S. Pat. No. 3,901,389, and FIG. 3 of U.S. Pat. No. 4,496,124. In the last illustration, the bottle body is at the side of the support member overlying the portion of the support member below it. The axis of the aperture is usually inclined relative to the support member to provide acute-angled corners to engage the bottleneck. The degree to which the apertures are inclined depends on the degree of inclination of the support and the desired attitude of the bottle to the support.

The bottle stand of the present invention shown in FIGS. 1 to 4 includes two elongated legs 1 of rectangular cross section which are connected in crossing relationship so that the stand is symmetrical about a vertical plane through the crossing as shown in FIG. 1 when the lower ends 2 of its legs are resting on a planar horizontal supporting surface such as a table. It is preferable, although not necessary, for the lower ends 2 of the legs 1 to be beveled at an angle such that they will rest flat on the supporting surface.

The angle of crossing of the legs is dependent on the shape of the interfitting notches 3 in the adjacent marginal portions of the legs 1. It is preferred that each notch be located closer to one end of each leg than the other end. In FIGS. 1 and 3, the notches are located closer to the upper ends of the legs than to their lower ends to provide a shorter upper end portion 4 and a longer lower end portion 5. The edge of each leg 6 remote from the other leg can be square or grooved, as shown in FIGS. 1, 3 and 4, for artistic purposes, but the shape of such remote edges is immaterial.

It is preferable that the notches 3 be square notches so that, when they interfit, the legs 1 will be connected substantially perpendicularly so that the angle 7 between the legs will be approximately a right angle and the bevel of the lower end 2 of each leg 1 will be 45 degrees.

Each of the legs 1 has an aperture 8 extending through it adjacent to the location of the crossing formed by the interengaged notches 3, as shown in FIGS. 1 and 3. Because the notched edge portions of the legs 1 overlap slightly, as shown in FIG. 4, only sufficiently to provide a firm connection between the legs 1, the apertures 8 may be approximately centered widthwise of the legs and still provide sufficient clearance between the neck of each bottle B inserted through an aperture in one leg, as shown in FIG. 1, and the adjacent edge of the other leg. The angle of the axis of each aperture 8 relative to its leg will be such that, taking into account the inclination of the leg, the bottle B will slope slightly toward its neck, as shown in FIG. 1, so that the liquid contents of the bottle will keep the cork in the bottleneck moistened.

The shape of the upper end 9 of each leg is immaterial but, conveniently, it can be beveled to provide a surface parallel to the lower end surface 2 of the leg.

Each leg 1 of the stand shown in FIGS. 1 to 4, inclusive, has through it only one aperture 8 for receiving a bottleneck. The center of gravity of each bottle B if empty or filled with liquid would be outside of the base profile of the stand if the bottle were overslung, i.e., the neck of the bottle were inserted into the aperture from the upper side of the leg, as is apparent from FIG. 1. In order for the stand to balance, it would be necessary to have the neck of a bottle lodged in each of the apertures 8. The stand might balance with the neck of only one overslung bottle inserted in one of the apertures if such bottle were only partially filled with liquid, such as perhaps a quarter full, or if the bottle were supported in underslung fashion, i.e., the bottle neck were inserted into the aperture from the underside of the leg.

Figure 6:
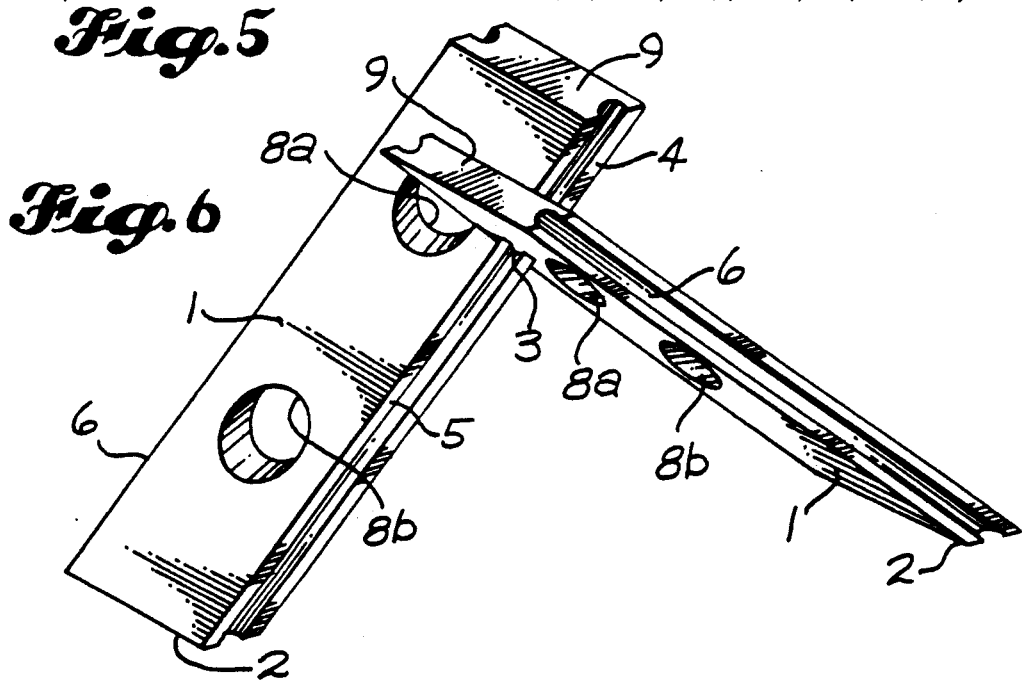
FIG. 6 is a top perspective of the bottle stand shown in FIG. 5.
Figure 7:
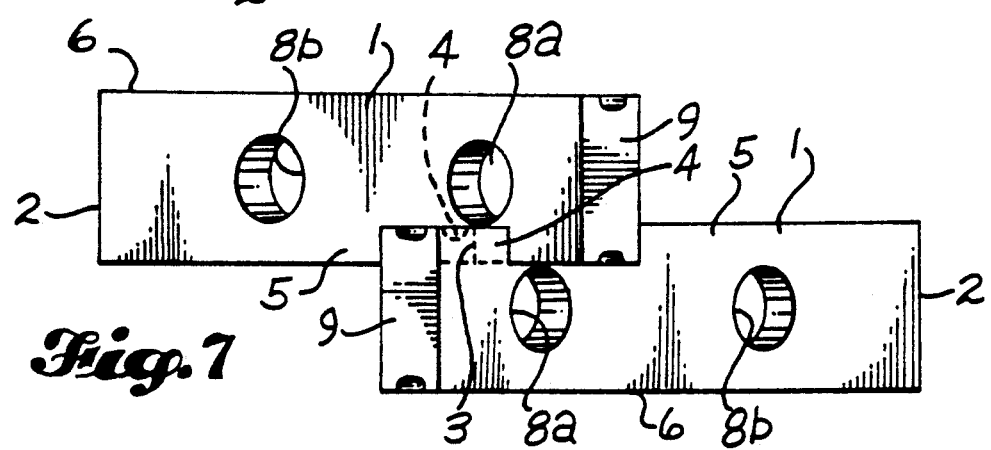
FIG. 7 is a top plan of the bottle stand shown in FIG. 5.

The capacity of the stand shown in FIGS. 5 to 7, inclusive, is greater than the capacity of the stand shown in FIGS. 1 to 4, inclusive, because each of the legs 1 has in it two bottleneck-receiving apertures 8a and 8b spaced lengthwise of the leg. The apertures 8a of the two legs are located adjacent to the crossing of the legs as shown in FIG. 5.

In this form of the stand, the angle 7 between the legs is still approximately a right angle, but the lengths of the lower leg parts 5 below the crossing are greater than in the stand shown in FIGS. 1 to 4, inclusive, so that the center of gravity of each upper overslung bottle B with its neck inserted in an aperture 8a entering from the upper side of the leg would be within the base profile of the stand. Consequently, the stand would rest stably on its supporting surface even if there were an overslung bottle B in only one of the apertures 8a. The stand would, of course, still be stable if the neck of an overslung bottle were inserted in each of the apertures 8a and might be stable if the neck of an overslung bottle were inserted in the aperture 8a of one leg and the neck of an overslung bottle were inserted in the aperture 8b of the other leg. The stand would not be stable, however, if only one overslung bottle had its neck inserted in an aperture 8b and none of the other apertures had a bottleneck inserted in it, although it would be stable if such bottle were underslung and generally horizontal.

Figure 8:
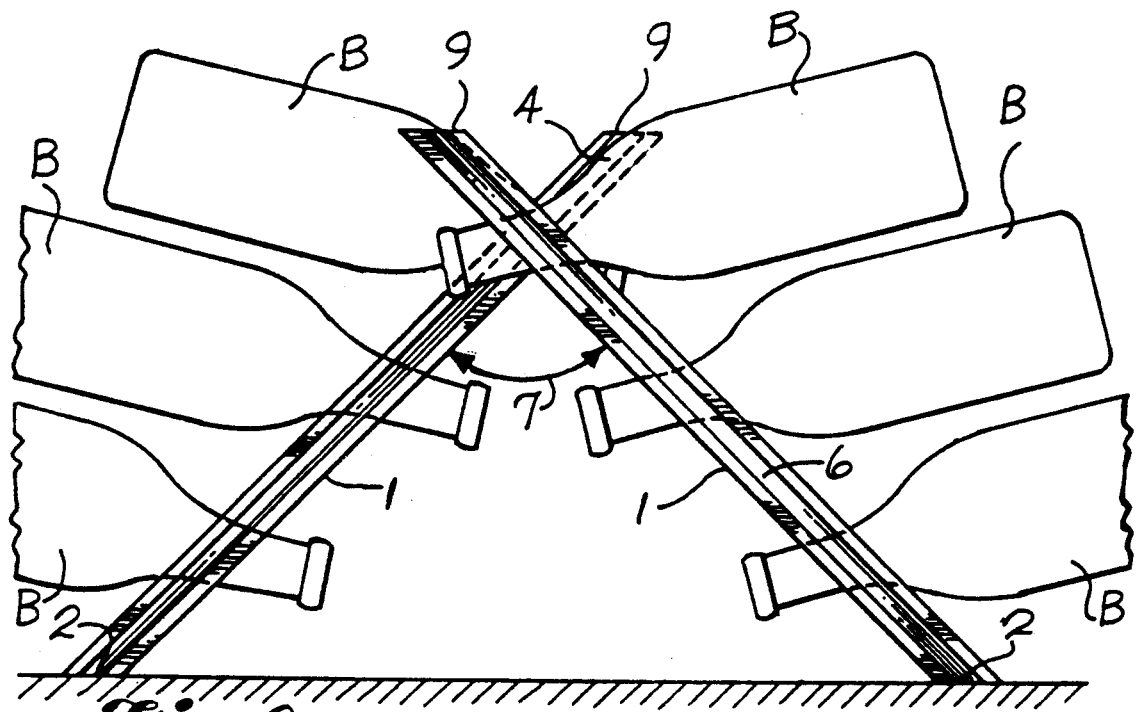
FIG. 8 is a side elevation of a similar bottle stand having still greater capacity.
Figure 9:
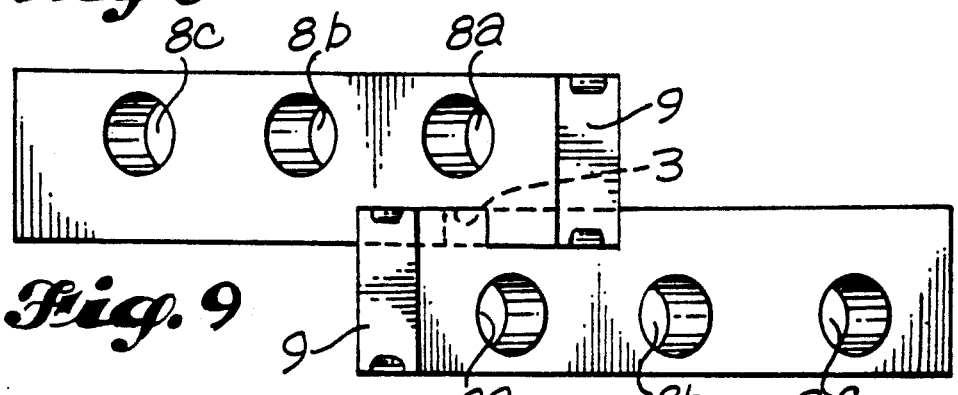
FIG. 9 is a top plan of the bottle stand of FIG. 8.

In the modification of the stand shown in FIGS. 8 and 9, the legs 1 are still longer than the legs in the stand of FIGS. 5 to 7, and each leg has in it three bottleneck-receiving apertures 8a, 8b and 8c. In this instance again, the top apertures 8a are located adjacent to the crossing of the legs.

With this construction, the stand would be stable if only one empty or full overslung bottle were supported by the stand with its neck inserted through an aperture 8a, and might be stable if the neck of the sole bottle were inserted through an aperture 8b. Certainly the stand would be stable if two overslung bottles had their necks inserted through the two apertures 8a or 8b, or if there were a combination of overslung bottles having their necks extending through apertures 8a and 8b with at least one bottle supported by each leg. If there were only one overslung bottle supported by the stand and the neck of that bottle were inserted through an aperture 8c, the stand would be unbalanced, but it would be stable if such bottle were underslung.

Figure 10:
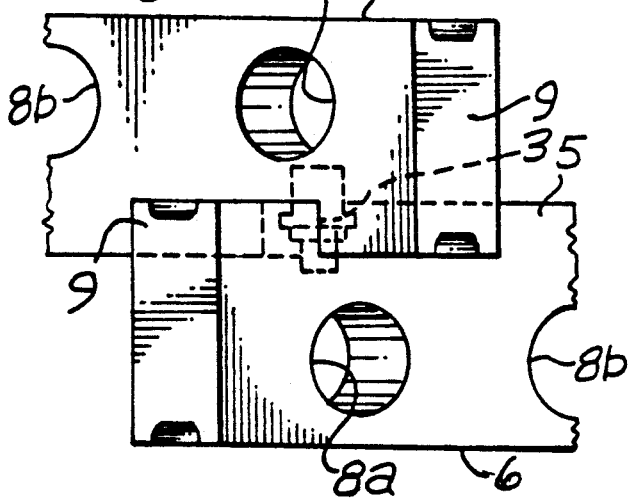
FIG. 10 is a fragmentary enlarged top plan of a bottle stand such as shown in FIGS. 5 to 7 or in FIGS. 8 and 9 showing a connector for connecting the two legs of the stand.
Figure 12:
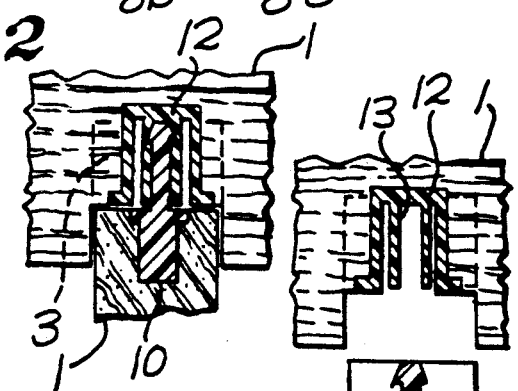
FIG. 12 is a similar detail section showing the components of the connector interengaged.
Figure 11:
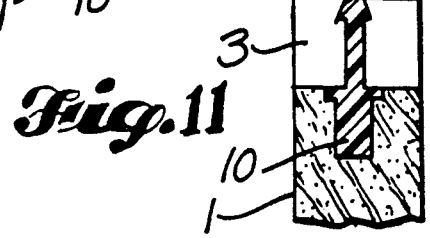
FIG. 11 is a detail sectional view through the connector of FIG. 10 showing the connector components in disconnected relationship.

In order to attach the legs 1 together more securely in any of the forms of the stand shown in FIGS. 1 to 4, 5 to 7 and 8 and 9, the interfitting joint between the two legs 1 could have a pin-and-socket connector such as shown in FIGS. 10 to 12. Such connector includes a pin 10 having an anchored end secured in the bottom of the notch in the edge portion of one leg which is engageable with a socket member 21 anchored in the bottom of the cooperating notch in the edge of the other leg. Such socket member has an inner resilient cavity to receive snugly the head of the pin 10.

The stand shown in FIGS. 13 to 15 is similar to the stand shown in FIGS. 5 to 7 and is made of identical leg members 1, except that such leg members have their notches interfitted in reverse and the stands are inverted so that the bottoms 2' of the shorter ends 4 rest on edges instead of having a flat surface engageable with the supporting surface. Also, the relation of the axes of the apertures to the legs would be different to accommodate the underslung bottles shown in FIG. 13. The upper ends 9' of the legs are shown as being of generally semicylindrical shape, but such shape is immaterial.

In this instance, it is necessary for opposite underslung bottles B to have their necks received in leg apertures in order to balance the stand stably. The stand could have only bottles engaged in the upper holes or bottles engaged only in the lower apertures, however, or perhaps a bottle engaged in the upper aperture of one leg and a bottle engaged in the lower aperture of the other leg.

In FIG. 14, the stand is the same as that shown in FIG. 13 except that the apertures through the legs for receiving bottlenecks are of different inclination, as shown in FIG. 15, so that the bottlenecks will bind in such apertures when the bottles are overslung, as shown in FIG. 14. In this stand, one or two overslung bottles could have their necks inserted in the upper apertures of the legs from the upper sides of the legs and the stand would be stable, whereas the stand would not be stable if only one overslung bottle had its neck inserted in a lower aperture. The stand would be stable when supporting only two overslung bottles, however, if the necks of both bottles were inserted in the lower apertures or the necks of both bottles were inserted in the upper apertures.

Figure 18:
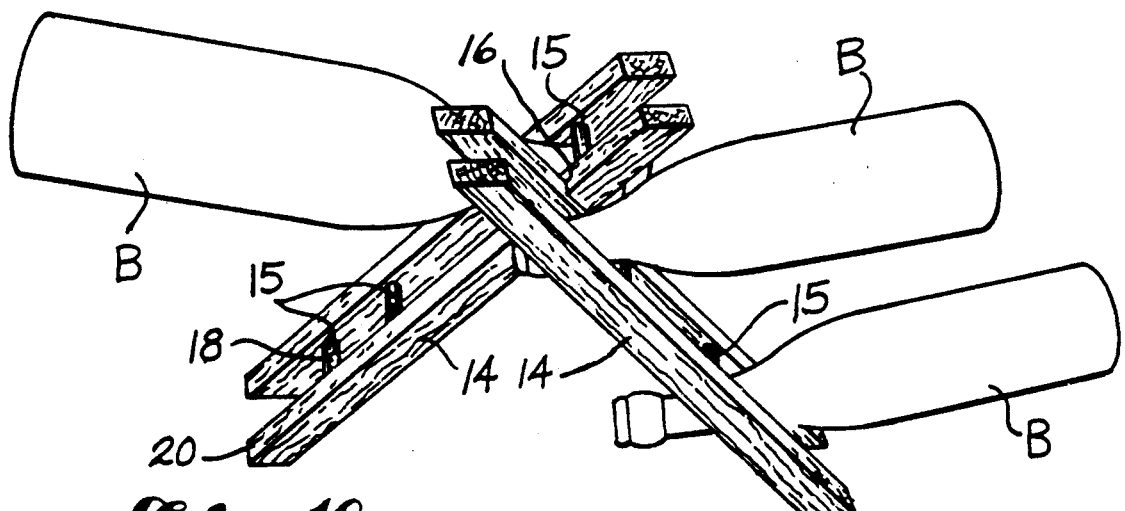
FIG. 18 is a top perspective of a bottle stand generally of the type shown in FIGS. 5 to 7, inclusive, but having a different type of construction.
Figure 16:
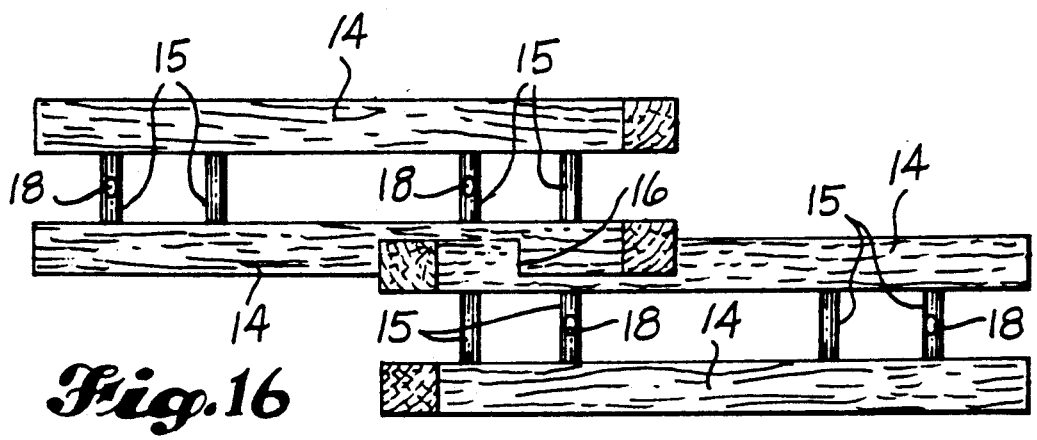
FIG. 16 is a top plan.
Figure 17:
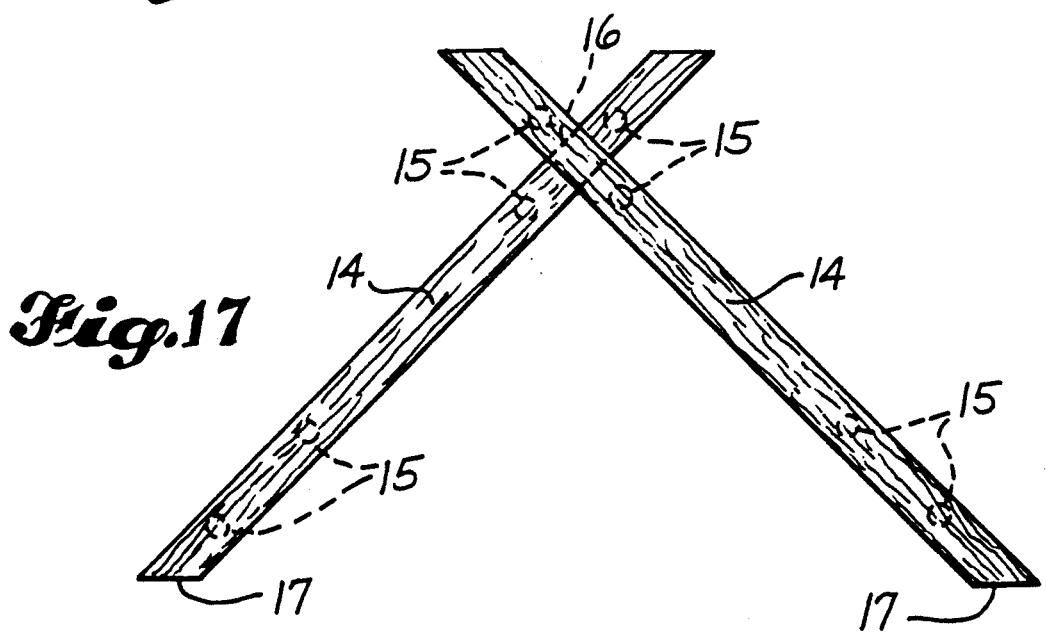
FIG. 17 is a side elevation.

The bottle stand shown in FIGS. 16, 17 and 18 is similar to the bottle stand shown in FIGS. 5, 6 and 7, except that in this instance each leg is fabricated from two rails 14 to leave a space between them. The rails are held in such spaced parallel relationship by two pairs of spacer pins 15. Again, the legs are interconnected by interfitting notches 16.

One pair of spacer pins is located remote from the crossing of the legs, whereas another pair of spacer pins is located adjacent to such crossing. The pins of each pair are spaced apart sufficiently to receive the neck of a bottle between them so as to constitute a bottleneck-receiving aperture.

In this instance, the stand is shown with the shorter portions of the legs forming the upper end portions of the legs and the longer portions of the legs forming the lower portions of the legs as in the stand shown in FIGS. 5 to 7, but the stand could be inverted to correspond to the stand shown in FIGS. 13 and 14, and the connection of the legs could be reversed so that the legs would rest on an edge rather than on a flat surface if desired.

Again, it is preferred that the notches 16 be such as so join the two legs 14 in approximately perpendicular relationship. In that case, the bottoms 17 of the legs would preferably be beveled at 45-degree angles so that the leg bottoms would rest flat on a supporting surface, but such bevel is not essential.

Also, it is desirable for the lower spacer 10 of each pair of spacer pins to have at its central portion a recess or notch 18 engageable by the neck of a bottle to deter shifting of the bottle neck sidewise in the space between the raise 14 if such spacing is appreciably greater than the diameter of a bottle neck.

I claim:

1. A freestanding bipod bottle stand comprising a pair of bottle-holding legs rigidly connected in crossed relationship symmetrical about a vertical plane through the crossing for effecting mutual bracing, said legs having apertures therethrough for receiving the neck of a bottle to support the bottle from a leg in cantilever fashion.

2. The bipod bottle stand defined in claim 1, and connecting means connecting the legs which includes a notch in one of the legs.

3. The bipod bottle stand defined in claim 2, in which the legs are of rectangular cross section and the notch is in one edge of a leg.

4. The bipod bottle stand defined in claim 3, in which the connecting means includes securing means for deterring removal from the notch of the edge portion of the other leg.

5. The bipod bottle stand defined in claim 3, in which both legs are of rectangular cross section and the connecting means includes interfitting notches in adjacent crossing edges of the legs.

6. The bipod bottle stand defined in claim 1, and securing means for deterring separation of the legs.

7. The bipod bottle stand defined in claim 6, in which the securing means includes peg-and-socket means.

8. The bipod bottle stand defined in claim 6, in which the securing means includes peg-and-socket means having a peg in one leg engageable with a socket in the other leg.

9. The bipod bottle stand defined in claim 1, in which each of the legs has a bottle-neck-receiving aperture adjacent to the crossing of the legs and spaced from the other leg to locate the neck of a bottle lodged in the aperture of one leg spaced from the other leg.

10. The bipod bottle stand defined in claim 1, in which each leg is fabricated and includes parallel rails connected by pairs of spacer pins, the spacing between the pins of each pair lengthwise of the rails being such as to accommodate the neck of a bottle therebetween for constituting a bottleneck-receiving aperture.

11. The bipod bottle stand defined in claim 10, in which the lower pin of each pair of spacer pins has a recess engageable by the lower side of a bottleneck received in the aperture between the pins of the pair for deterring movement of the bottleneck lengthwise of the spacer pins of such pair.

12. The bipod bottle stand defined in claim 1, in which each leg has in it a plurality of bottleneck-receiving apertures spaced lengthwise of such leg and at least one of said apertures is spaced downward from the crossing of the legs.

13. The bipod bottle stand defined in claim 12, the apertures in the two legs being located in corresponding locations relative to the crossing of the legs.

14. The bipod bottle stand defined in claim 1, in which the lower portions of the legs are crossed, each leg has a plurality of bottleneck-receiving apertures spaced lengthwise of such leg and at least one of such apertures is spaced upward from the crossing of the legs.

15. A freestanding bottle stand comprising a pair of elongated members, each of said members having a bottleneck-receiving aperture, and connecting means connecting said members in upwardly-diverging relationship and located lower than said bottleneck-receiving apertures.

16. The bottle stand defined in claim 15, in which the bottleneck-receiving apertures in the respective members are located in corresponding locations relative to the connecting means.

* * * * *